United States Patent [19]

Blackwelder et al.

[11] Patent Number: 4,932,612

[45] Date of Patent: Jun. 12, 1990

[54] METHOD AND APPARATUS FOR REDUCING TURBULENT SKIN FRICTION

[76] Inventors: Ron F. Blackwelder, 30531 Rue Langlois, Rancho Palos Verdes, Calif. 90274; Mohamed Gad-el-Hak, 15275 Hunting Ridge Trail, Granger, Ind. 46530

[21] Appl. No.: 115,635

[22] Filed: Oct. 26, 1987

Related U.S. Application Data

[63] Continuation-in-part of Ser. No. 833,096, Feb. 25, 1986, abandoned.

[51] Int. Cl.$^5$ .................. B64C 21/02; B64C 21/10
[52] U.S. Cl. .................. 244/207; 244/208; 244/209; 244/200; 244/130
[58] Field of Search ............... 244/198, 199, 200, 204, 244/207, 208, 209, 130; 114/67 A

[56] References Cited

U.S. PATENT DOCUMENTS

| | | | |
|---|---|---|---|
| 2,608,171 | 8/1952 | Pearce | 114/67 A |
| 2,873,931 | 2/1959 | Fleischmann | 244/200 |
| 3,161,385 | 12/1964 | Kramer | 244/210 |
| 3,289,623 | 12/1966 | Gray et al. | 114/67 A |
| 3,588,005 | 6/1971 | Rethorst | 244/199 |
| 3,604,661 | 9/1971 | Mayer | 114/67 A |
| 3,628,488 | 12/1971 | Gibson | 114/67 A |
| 4,516,747 | 5/1985 | Lurz | 244/204 |

OTHER PUBLICATIONS

Walsh, "Turbulent Boundary Layer Drag Reduction Using Riblets", AIAA Paper #82-0169, Jan. 11–14, 1982.
Gad-el-Hak & Blackwelder, A Drag Reduction Method for Turbulent Boundary Layers, 1987, AIAA-87-0358, pp. 1-12 (not prior art).
Liepmann & Nosenchuck, Active Control of Laminar–Turbulent Transition, 1982, J. Fluid Mech., vol. 118, pp. 187-204.
Bacher & Smith, A Combined Visualization–Anemometry Study of the Turbulent Drag Reducing Mechanisms of Triangular Micro-Groove Surface Modifications, 1985, AIAA-85-0548, pp. 1-10 (not prior art).
Arakeri & Narashima, Effect of Pulsed Slot Suction on a Turbulent Boundary Layer, 1983, AIAA Journal, vol. 21, pp. 306-307.
Sokolov et al., A "Turbulent Spot" in an Axisymmetric Free Shear Layer. Part 1, 1980, J. Fluid Mech., vol. 98, Part 1, pp. 65-95.
Verollet et al., Turbulent Boundary Layer with Suction and Heating to the Wall, 1972, Heat & Mass Transfer in Boundary Layers, vol. 1, pp. 157-160.
Gad-el-Hak & Blackwelder, The Discrete Vortices from a Delta Wing, 1985, AIAA Journal, vol. 23, No. 6, pp. 961-962.
Riley & Gad-el-Hak, The Dynamics of Turbulent Spots, Frontiers in Fluid Dynamics, pp. 123-155, 1985 (not prior art).
Gad-el-Hak et al., On the Interaction of Compliant Coatings with Boundary-Layer Flows, 1984, J. Fluid Mech., vol. 140, pp. 257-280.

*Primary Examiner*—Galen Barefoot
*Attorney, Agent, or Firm*—Don R. Mollick

[57] ABSTRACT

A method and apparatus for reducing the skin friction on objects in relative motion to a field of fluid. The areas of relative low speed motion are fixed to align with a series of ridges on the surface of the object. The areas of low speed motion aligned with the ridges are removed by suction from the turbulent boundary layer which results in a reduction of drag on the object. An alternative embodiment injects fluid into areas of relative high speed between the ridges to reduce the shear and the drag caused by it. Selective suction and injection are combined in one apparatus in a second alternative embodiment. A fourth embodiment injects a polymeric solution to reduce drag. A fifth embodiment heats the fluid in specified areas to reduce drag. A sixth embodiment uses a compliant material in specified areas of the surface in contact with flowing fluid to reduce drag.

26 Claims, 5 Drawing Sheets

METHOD AND APPARATUS FOR REDUCING TURBULENT SKIN FRICTION

This application is a continuation-in-part, of application Serial No. 833,096, filed 2/25/86, now abandoned.

FIELD OF INVENTION

This invention pertains to reduction of friction caused by fluids in motion relative to surfaces, particularly to reduction of skin friction drag by contouring of the surface and application of selective suction, selective injection, selective heating, selective polymer injection or selective surface compliance. The device can be applied to any vehicle moving in air such as automobiles, airplanes, etc., or moving in water, such as submarines, ships, torpedoes, etc.

BACKGROUND OF INVENTION

When objects move through a fluid media, drag is produced on all surfaces of the object. Common examples include aircraft moving through the air and ships moving through the sea. A similar mechanism occurs in pipelines where the fluid moves past the inner surface of the pipe. At least half of the drag for a commercial aircraft in the cruise condition is due to skin friction.

Skin friction is friction created when a fluid is in relative motion to a surface. Two general methods to reduce skin friction have been proposed. The first method is laminar flow control. This method takes advantage of the fact that friction is lower if the fluid is in a laminar flow condition than in a turbulent flow condition. The second method is turbulence control, where the turbulence is tamed or manipulated in such a way as to reduce the drag.

The most successful method for reducing turbulence's drag to date is the addition of tiny grooves parallel to the flow of fluid. This method confines incipient bursts of turbulence so that they cannot expand and disrupt the boundary surrounding an object in relative motion to a fluid. In order to understand the operation of the grooves, one must first understand the nature of the drag due to turbulence. To a large degree, drag is caused when an area of turbulent flow is found between the main flow of the fulid and the surface of the moving vehicle. Recent turbulent boundary layer research has clearly shown that the wall region is dominated by a sequence of eddy motions that are collectively called the bursting phenomenon. It begins with a pair of elongated, streamwise, counter-rotating vortices having diameters of approximately 40 $v/u_\tau$, where $v/u_\tau$ is the viscous length scale, $v$ is the kinematic viscosity and u is the friction velocity. These vortices exist in a strong shear and induce low- and high- speed regions between them as shown in Section 2—2 of FIG. 1 (prior art). The vortices and the accompanying eddy structures occur randomly in space and time. However, their appearance is regular enough that an average spanwise wavelength of approximately 80–100 $v/u_\tau$ has been identified. It is also observed that the low-speed regions grow downstream and develop inflectional U(y) profiles as sketched. At approximately the same time, the interface beteen the low-and high-speed fluid begins to oscillate. The low-speed region lifts up away from the wall as the oscillation amplitude increases and the flow rapidly breaks down into a completely random pattern. Since this latter process occurs on a very short time scale, it is referred to as a "burst". The low-speed regions are quite narrow, e.g., 20 $v/u_\tau$, and may also have significant shear in the spanwise direction.

The longitudinal grooves confine the bursts to a non-random pattern as well as reducing the rate at which they lift up from the wall. The result is a reduction in skin friction, or drag, of from 5–8%. This reduction has been insufficient to lead to wide-scale commercial application of the ridging method.

Another approach to reduction of turbulent skin friction drag is the provision of a porous surface of the object through which fluid is withdrawn to entirely remove the boundary layer. This method is fully described in U.S. Pat. No. 3,604,661 to Robert Alfred Mayer, Jr. While this method is effective to reduce skin friction it may not meet with widespread commercial application because the power required to produce a sufficient flow through the slots is in excess of the friction savings. Accordingly, there is a demand for an economical method of reducing skin friction.

SUMMARY OF THE INVENTION

The invention provides an economical method and apparatus for reducing skin friction on bodies moving relative to a fluid. The method takes advantage of recent discoveries regarding the bursting phenomenon.

The invention combines the effect of slective suction with a longitudinally ribbed surface to achieve substantial drag reduction. The suction is selectively applied in both space and time to achieve maximum effect with minimal power.

The surface on which skin friction is sought to be reduced is ribbed with longitudinal protuberances such as grooves parallel to the direction of fluid flow. Slots aligned with the mean flow direction are provided at the peaks of the grooves at selected locations, and suction is applied to the slots intermittently.

In the above described embodiment of the invention, suction is applied selectively at the peaks of the longitudinally ribbed surface in air or water flows. Our published work (prior art AIAA Paper No. 87-0358, entitled "A Drag Reduction Method for Turbulent Boundary Layers", published by the American Institute of Aeronautics and Astronautics, New York, January 1987) gives the theoretical basis for this embodiment, as well as the necessary equations to determine the geometry of the ribbed surface and the suction slots. The published work also gives the necessary amount of suction for a given flow condition.

Four other embodiments of the invention are also claimed:

1. Selective injection of secondary fluid at the valleys of the ribbed surface in air or water flows.
2. Selective heating at the valleys of the ribbed surface air flows; or selective heating at the peaks of the ribbed surface in water flows.
3. Selective injection of drag-reducing, long-chain-molecules polymers at the valleys of the ribbed surface in water flows.
4. Selective wall compliance at the peaks of the ribbed surface in air or water flows.

The theoretical basis for the equivalency of all the embodiments of the present invention is found in the paper by H. W. Liepmann, G. L. Brown, and D. M. Nosenchuck, entitled "Conrol of Laminar-Instability Waves Using a New Technique," published by Cambridge University Press, United Kingdom, in the *Journal of Fluid Mechanics*, Volume 118, pp. 187–200, 1982 (prior art). Equivalency implies that if one embodiment has been proven to work, then all the other embodiments should also work.

DESCRIPTION OF THE FIGURES

Figure 1:
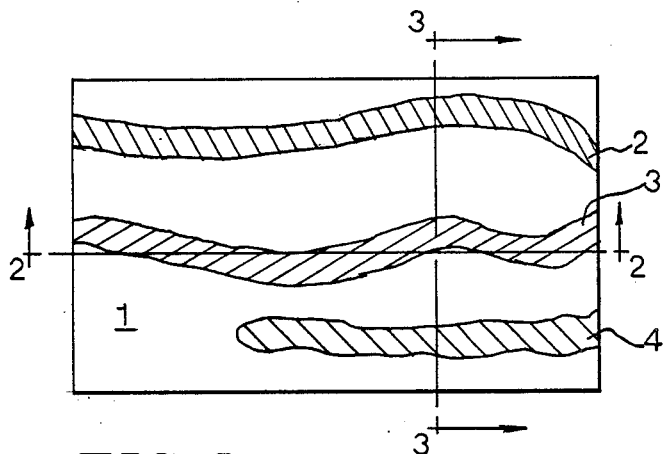
FIG. 1 is a top plan view of low-speed streaks in contact with a planar surface.

FIG. 1 is a top plan view of low-speed streaks in contact with a planar surface. When fluid is moving past a planar surface the motion is not uniform. This is contrary to the classical view that there is an even gradient between the fluid in contact with the surface and the fluid sufficiently removed to be unaffected by the surface. In fact, low-speed streaks 2,3 and 4 are created near surface 1. Streaks 2,3 and 4 move around and detach from surface 1 at times. Streaks 2, 3 and 4 start from a point and grow downstream.

Figure 2:
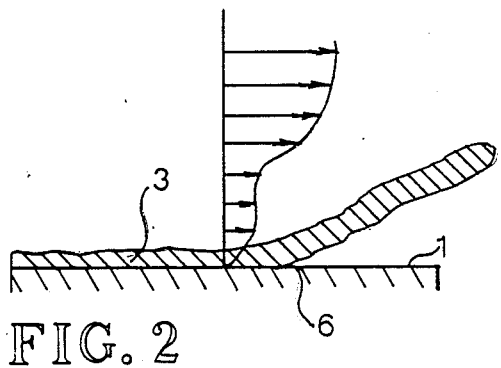
FIG. 2 is a section view of FIG. 1 along 2—2.

FIG. 2 is a section of FIG. 1 along 2—2. Streak 3 has begun to detach and lift from surface 1 at point 6. When this detachment occurs, the interface between high- and low-speed fluids begins to oscillate. The low-speed region lifts up away from surface 1 as the oscillation amplitude increases and the flow rapidly breaks down into a completely random pattern. This rapid breakdown is called a "burst". This phenomenon is collectively called "the bursting process" and is responsible for about 80% of the skin friction drag in a turbulent boundary layer. The low-speed streaks are quite narrow and are on the order of 20 times the viscous scale (20 $\nu/u_\tau$) which is the kinematic viscosity (divided by the frictional velocity ($u_\tau$). For air, the kinematic viscosity is 0.15 cm$^2$/sec, and for water it is 0.01 cm$^2$/sec The friction velocity for both air and water is approximately 4 per cent of the vehicle speed.

Figure 3:
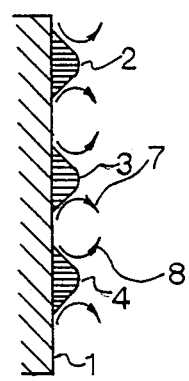
FIG. 3 is a section view of FIG. 1 along 3—3.

FIG. 3 is a section view of FIG. 1 along 3—3. A pair 7,8 of elongated, streamwise, counter-rotating vortices having diameters of about 40 times the viscous scale (40 $\nu/u_\tau$) are shown between low-speed streaks 4,3. Vortices 7, 8 exist in strong shear and give birth to low-speed streaks 4, 3. Vortices 7, 8 occur randomly in space and time. There is, however, a regularity that produces an average spanwise wavelength of 80-100 times the viscous scale (80–100 $\nu/u_\tau$). The turbulent area in the vicinity of surface 1 is thus not completely unordered and successful means of dealing with skin friction need to bring a greater degree of order to this area. The magnitude of the skin friction is associated with the randomness of the turbulence in this area. The above discussion explains the use of long-chain polymers introduced into liquid flow to increase flow or so called "slippery water". The use of polymers decreases drag by 50-80%. This occurs because the polymers increase the length scale without altering the eddy structure. When the distance between vortices 7, 8 increases the sublayer thickness, etc. all increase. The polymers do not alter kinematic viscosity ($\nu$) very greatly but increase the length scale by either changing the wall shear or the scale of eddies. Understanding the above processes is fundamental for understanding of the invention.

Figure 4:
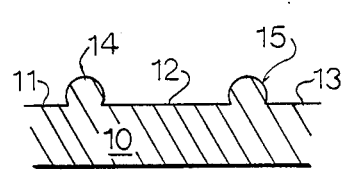
FIG. 4 is a section elevation view of a groove used in the invention.

FIG. 4 is a section elevation view of a groove used in the invention. The use of grooved surfaces to decrease drag is known. Other types of protuberances such as fins, cylinders, etc. aligned in the mean flow direction may be used also. Surface 10 is cut by grooves 11, 12 and 13. Since the bursting process is the fundamental process for transferring energy from the fluid to the surface, it is therefore logical that control of the ejection of low-speed streaks from a surface reduces drag. Surface ribbing is one process for doing so. The use of a groove as in FIG. 4 will reduce drag by 5 to 8%. The use of grooves 11, 12 and 13 seems to "focus" the low-speed streaks, if the peak-to-peak distance is equal to 100 $\nu/u_\tau$ and the peak-to-valley distance is equal to 5 $\nu/u_\tau$. The ridges 14, 15 between grooves 11, 12 and 13 seem to act as nucleation sites for the low-speed streaks. A streak is thus positioned above each peak. Since the randomness of the turbulent area is reduced there is a reduction of drag. In this invention the use of grooves 11, 12 and 13 is to fix the position of the low-speed streaks and thus allow their removal at minimal expenditure of energy.

Figure 5:
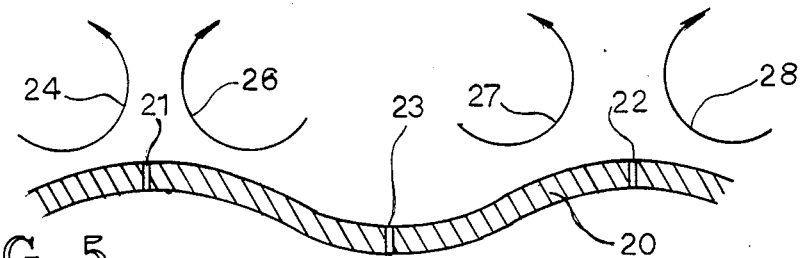
FIG. 5 is a section view of flow past a planar surface with selective suction.

FIG. 5 is a section view of flow past a planar surface 20 with means to apply suction and injection. At points 21 and 22 fluid is removed by suction normal to the plane. At point 23 fluid is discharged into the flow of fluid. Motion of the vehicle in this case is out of the page toward the viewer. Points 21, 22 and 23 are selected to take advantage of the periodic nature of vortices 24, 26, 27 and 28. Thus injection site 23 is positioned at the point where vortices 26 and 27 provide a downward current. Conversely, suction sites 21 and 22 are located whre there is an upward current. This is equivalent to applying suction at the low-speed streaks and injection of fluid at the areas between the low-speed streaks. This injection is a second embodiment of the invention.

Figure 6:
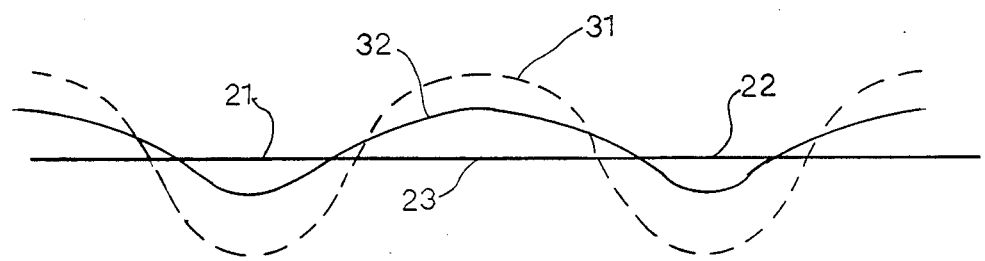
FIG. 6 is a graph of velocity at points along FIG. 5.

FIG. 6 is graph of the velocity at various points along plane 20. Line 21 indicates the spanwise velocity distribution without suction and injection. Line 32 indicates spanwise velocity distribution with suction and/or injection. Points 21, 22 and 23 from FIG. 5 are indicated. Clearly the profile of each curve is inflectional with two points of inflection per wavelength, but the degree of inflection is reduced by using suction or injection.

Figure 7:
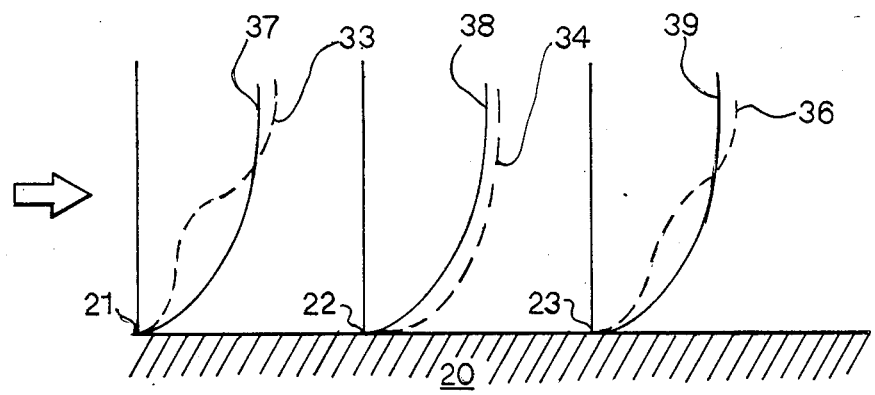
FIG. 7 is a graph of velocity along a line normal to FIG. 5.

FIG. 7 is a graph of the velocity profile normal to the planar surface 20. Planar surface 20 is as shown at FIG.

5. Profiles are indicated at points 21, 22 and 23. As in FIG. 6, profiles without suction or injection are indicated by dotted lines 33, 34 and 36. Similarly profiles with suction and injection are indicated by solid lines 37, 38 and 39. As is apparent at points 21 and 22 a change in inflectional profile is also evident as well as a general reduction of shear. In all cases the shear associated with the inflection points is reduced by suction and injection. Since the inflectional profiles are all inviscidly unstable with growth rates proportional to the shear, the resulting instabilities are weakened by the suction-/injection process. Since turbulent shear stress, $-\overline{uv}$ results from inflectional instability, the turbulent shear stress is reduced. With a reduction of turbulent shear stress a reduction of drag also occurs.

Prior attempts have been made to reduce shear stress by suction and/or injection of fluid. Such attempts have not met with widespread success because unlike the idealized situation in FIG. 6, the position of low-speed streaks is somewhat irregular. The result is that if suction is not under a low-speed streak, the power needed to produce the suction is wasted. In some cases the use of suction and/or injection could actually be counterproductive. Accordingly, proper practice of this invention lies in the selective application of suction and/or injection to reduce drag. In other words, using the surface ribbing to lock-in the low-speed streaks so that the precise location for the application of suction and-/or injection is known is a priority.

Figure 8:
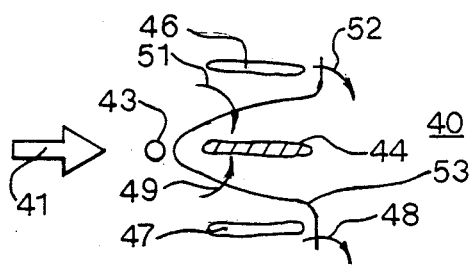
FIG. 8 is a top plan view of an apparatus for producing artificial bursts.

FIG. 8 is a top plan view of an experimental apparatus for producing artificial bursts. This apparatus has been used to provide the theoretical basis for the present invention. A planar surface 40 is in the plane of the drawing with flow going from left to right as indicated by arrow 41. Plane 40 is further provided with a single suction hole 43. When sudden suction is applied to hole 43 a high-speed region 44 is created behind hole 43. Two stable low-speed streaks 46, 47 are created to either side and downstream of hole 43. The regions 44, 46 and 47 are created directly by vortexs 48, 49, 41 and 52, indirectly created by suction through hole 43. Vortexs 48, 49, 51 and 52 are actually continuous as indicated by mean vortex line 53. The sudden withdrawal of fluid distorts a normal straight vortex line to form the counter-rotating longitudinal vortices 48, 49, 51 and 52. Due to strain by the shear, vortices 48, 49, 51 and 52 induce the low-speed streaks 46 and 47 and high speed area 44. The result is a type of synthetic bursting type process. The analog is not exact because the low-speed streaks are stable rather than unstable and of very limited duration. Nonetheless, streaks 46 and 47 can be removed by suction.

Figure 9:
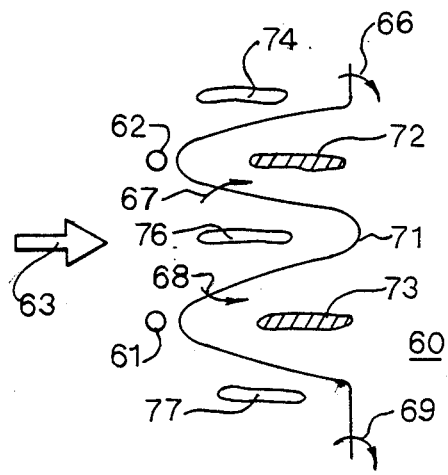
FIG. 9 is a top plan view of an expanded apparatus as in FIG. 8.

FIG. 9 is a top plan view of the FIG. 8 experiment expanded. This time planar surface 60 is provided with two suction holes 61 and 62 with the direction of flow indicated by arrow 63. When there is a sudden withdrawal of fluid through holes 61 and 62, vortices 66, 67, 68 and 69 are again created. The resulting distortion of the mean vortex line 71 by shear results in creation of high speed areas 72, 73 and low-speed streaks 74, 76 and 77. Low-speed streak 76 is particularly important because it is unstable and a close relative to the low-speed streaks found in boundary layers which contribute to drag as explained above. Suction removes the low-speed streaks including the unstable streak 76.

Figure 10:
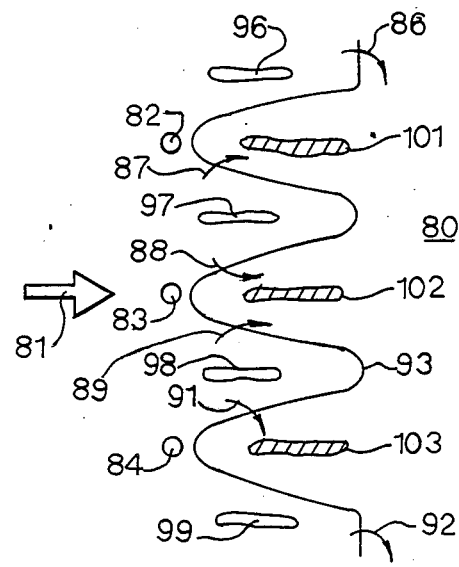
FIG. 10 is a top plan view of a second expanded apparatus as in FIG. 8.

FIG. 10 is a top plan view of an experiment as in FIG. 8. In this case, plane 80, with flow direction indicated by arrow 81, is provided with three suction holes 82, 83 and 84. Suction removal of fluid through holes 82, 83 and 84 creats vortices 86, 87, 88, 89, 91 and 92, whose position is indicated by mean vortex line 93. Again, the shear results in creation of a series of low-speed streaks 94, 96, 97 and 98 and high-speed areas 101, 102 and 103. In this case, low-speed streaks 97 and 98 are both unstable so a determination can be made on the effect of suction on adjacent unstable low-speed streaks 97 and 98. This is the closed analogy to a boundary layer and suction can be used to remove streaks 97 and 98. The above processes are equally applicable for use in the injection of fluid in the vicinity of high - speed streaks 101, 102 and 103. The experiments above are done using a laminar flow over a plane illuminated by laser light. Hydrogen bubbles are used to visualize the flow of the fluid. By use of this method a determination of the optimum amount of suction or injection needed can be specified for use in a particular fluid or surface. Visualization of natural turbulent boundary layers is much more difficult to interpret due to the natural bursts which are not repeatable or controlled. Accordingly, this appartaus is necessary to determine the parameters of the invention.

Figure 11:
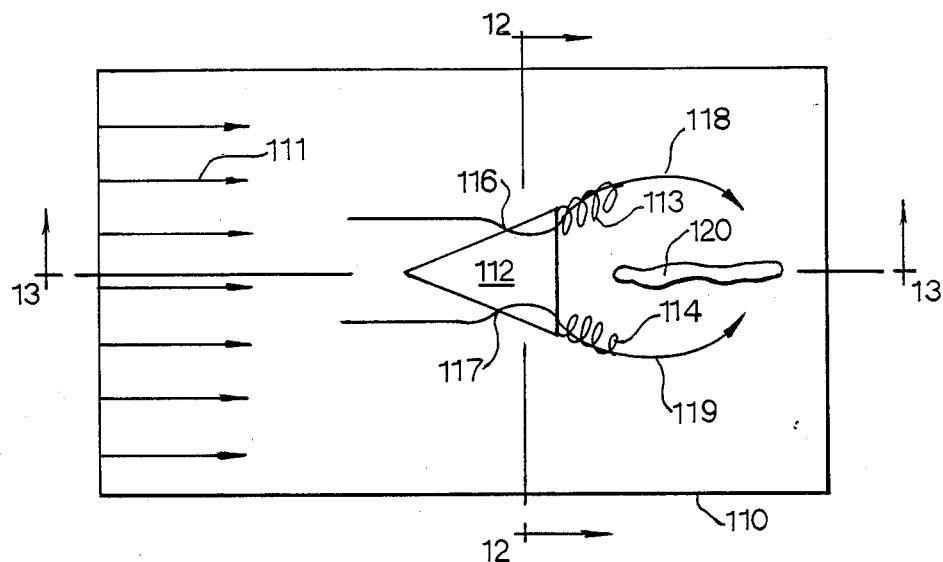
FIG. 11 is a top plan view of a third apparatus for production of artifical bursts.

FIG. 11 is a top plan view of a different apparatus for producing a simulated burst. This apparatus is useful for producing artificial bursts at a fixed location. The apparatus includes a flow tank or wind tunnel 110 with a constant flow of fluid indicated by arrows 111. In the flowing fluid is a delta wing 112. It is well known that fluid flowing past a pitched delta wing 112 produces two counter-rotating vortices 113, 114 beginning at the leading edges 116, 117. At the line where vortices 113, 114 interact with each other an unstable low-speed streak 120 is formed. To simulate the bursting process, wing 112 can be pitched suddenly. Streamlines 118, 119 indicate the flow of fluid particles when this pitching occurs.

Figure 12:
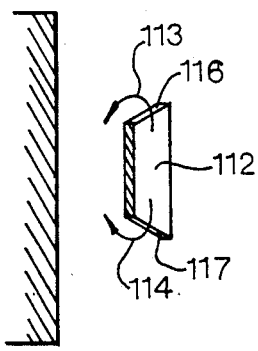
FIG. 12 is a section end view of the FIG. 11 apparatus through 12—12.

FIG. 12 is a section end view of the FIG. 11 apparatus through lines 12—12. This Figure clearly shows the relationship of leading edge vortices 113, 114 to wing 112 and its leading edges 116, 117.

Figure 13:
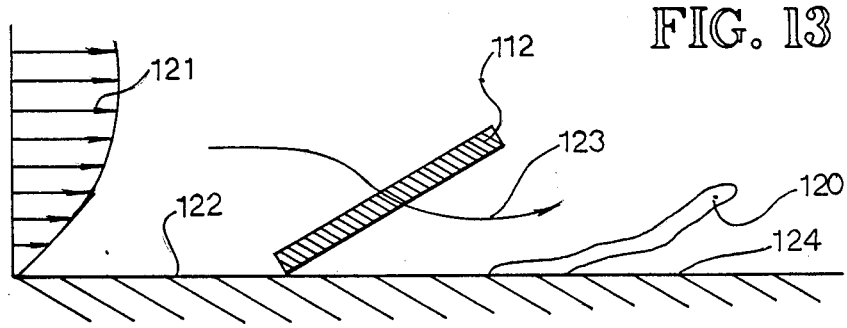
FIG. 13 is a section end view of the FIG. 11 apparatus through 13—13.

FIG. 13 is a side section view of the FIG. 11 apparatus through lines 13—13. In this view the velocity profile is shown by arrows 121 as the fluid flows over the plane 122. Suddenly pitching delta wing 112 produces fluid flow indicated by streamline 123, which, in turn results in the unstable low-speed streak 120. Streak 120 is shown detaching from the plane 122 and is a very close approximation of the natural burst pattern in a turbulent boundary layer. A slot positioned at point 124 and extending streamwise allows suction to be applied to streak 120. If the flow is visualized by use of fluorescent dyes and hydrogen bubbles and illuminated by laser light, the reaction of streak 120 is observable. The amount of suction is then measured to find the minimal amount needed to suppress streak 120 for a given fluid and flow rate.

Figure 14:
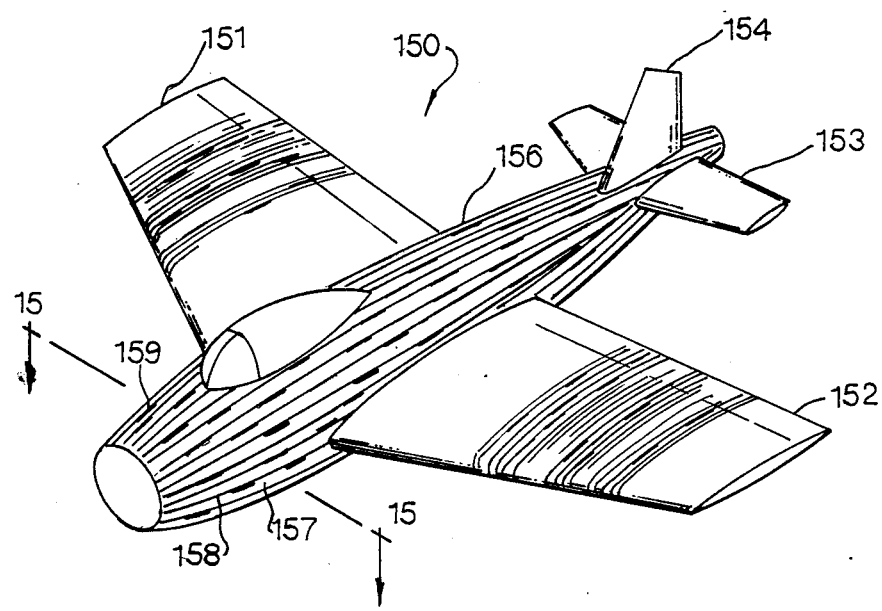
FIG. 14 is a top plan view of an aircraft utilizing the invention.

FIG. 14 is a top plan view of an aircraft utilizing the invention. The aircraft 150 includes wings 151, 152, a stablizer 153 and rudder 154, all attached to a fuselage 156 Drag largely occurs due to skin friction on the fuselage 156 and the wings 151, 152. Fuselage 156 and the wings 151, 152 are covered with a large number of longitudinal grooves 157. Ridges 158 are formed between grooves 157. On the peaks of ridges 158 are a number of slots 159. The occurrence of slots 159 is periodic in space.

Figure 15:
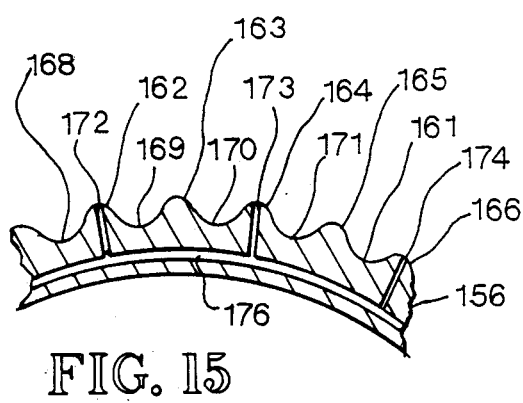
FIG. 15 is a side section view of the FIG. 14 aircraft.

FIG. 15 is a side section view through FIG. 14 at line 15—15. This is a section view of a portion of an aircraft fuselage 156. The outer skin 161 of the aircraft is rippled to form a series of ridges 162, 163, 164, 165 and 166 and a series of grooves 168, 169, 170 and 171. The configuration of skin 161 is preferably contoured so that it is similar to that shown in FIG. 4. Ridges 162, 164 and 166 are provided with suction slots 172, 173 and 174. Slots 172, 173 and 174 are connected to a channel 176 which is connected to a suction manifold (not shown). In operation suction is applied to the suction manifold at periodic intervals. When the aircraft is flying the low-speed streaks present in the turbulent boundary layer align with and are fixed to ridges 162–166 producing a 5–8% reduction in skin drag. The suction applied at slots 172–174 removes fixed low-speed areas before they can participate in the bursting process as described above. This results in a total drag reduction of 50% or more. Since the suction is applied selectively in both time and space, there is a minimal expenditure of energy in the suction process. This must not be confused with systems which intend to partially or totally remove the boundary layer by suction and consume large amounts of energy. The purpose of the invention is a disruption of th bursting process combined with a fixation of low-speed areas to allow use of selective suction.

Figure 16:
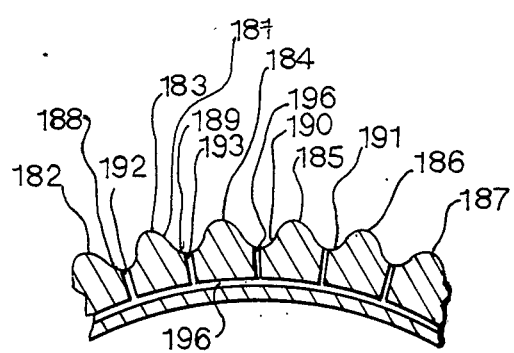
FIG. 16 is a side section view of a second embodiment of the FIG. 15 invention.

FIG. 16 is a section elevation view of an alternative embodiment of the invention. This embodiment is similar to the FIG. 15 embodiment in that the skin 181 of the fuselage is provided with a series of ridges 182–187 separated by grooves 188–191. Rather than suction slots, however, this embodiment is provided with injection slots $192 \geq 194$. Slots 192–194 are connected to a passage 196 which is connected to an injection manifold (not shown). In this embodiment, air is injected into the high-speed areas between the low-speed streaks at periodic intervals to retard the bursting process. The FIG. 15 and FIG. 16 embodiments could also be combined to both inject fluid into high-speed areas and apply suction to low-speed streaks.

Figure 17:
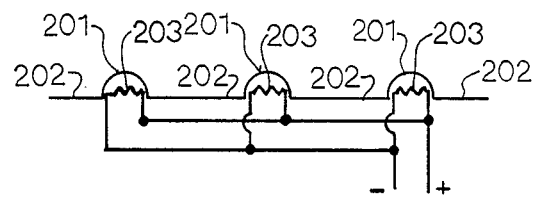
FIG. 17 is a third embodiment of the invention.

FIG. 17 shows an alternative embodiment of the invention. In this embodiment, most suited for water vehicles such as ships and submarines, there are a series of ridges 201 and valleys 202 parallel to the direction of water flow in a manner similar to that of FIG. 14. A heating means 203 is located at the apex of each ridge 201. Heating means 203 is shown as an electrical resistance heater in this embodiment. Equivalent heating means such as electrical induction or hot-fluid ducts could, of course, be substituted for heater 203. The application of heat at the apex of the ridges stabilizes the liquid flow in the same manner as continuous suction of fluid. For air flows, the application of heat at the valleys stabilizes the flow and reduces the drag.

Figure 18:
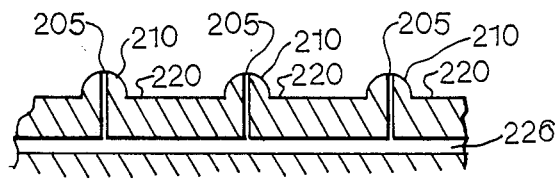
FIG. 18 is a fourth embodiment of the invention.

FIG. 18 shows yet another method for stabilizing flow. This embodiment uses a similar method as that of the FIG. 15 embodiment in that there are a series of ridges 210 and valleys 220. Ducts 225 are provided at the apex of each ridge. A solution of polymeric material is injected through vents 226. Suitable polymeric materials include solutions of polyethylene glycol and polyvinyl alcohol. This embodiment is suited for water flows.

Figure 19:
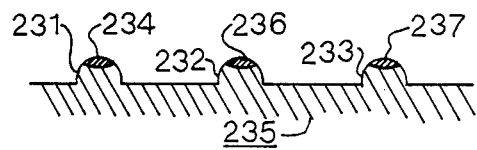
FIG. 19 discloses an embodiment of a compliant wall.

FIG. 19 illustrates another embodiment of the invention as in the other embodiments a surface 235 is provided with a series of ribs 231,232,233 using the above formulations for spacing and height. Each rib is provided with a compliant apex 234,236, and 237 respectively. Compliant apexes 234, 236, 237 are inserts of a compliant material such as rubber or an elastomeric polymer. The above inserts reduce drag in much the same manner as injection of a polymeric solution.

The invention is equally applicable to objects moving thorough water such as submarines and torpedoes, objects moving through air such as airplanes and automobiles, and fluid moving through pipelines. The parameters of the ridges and amount of suction and/or injection should be optimized for each fluid and for each vehicle.

Our own experiments indicate that suction can either be applied continuously or periodically. In the latter case, the period is determined from the equation:

$$P = 250 \, v/u_y^2$$

where P is the period in seconds, $v$ is the kinematic viscosity of the fluid in cm/sec ($\gamma = 0.01$ for water, and $v = 0.15$ for air), and $u_y$ is the friction velocity in cm/sec, which is approximately 4% of the vehicle speed. For example, if an airplane moves in air at a speed of 600 miles/hr., then $u_y = 1073$ cm/sec, and P $= 0.03$ msec. So that suction should be applied 30,000 times every second, each time lasting for 0.006 msec (P/5). Continuous suction can also be applied as shown in our paper, but the penalty for that will be the consumption of more energy and the reduction in net savings of fuel. The advantage of continuous suction is, of course, its ease of application.

The same experiments discusses above have indicated that the amount of selective suction necessary for eliminating the bursts of only 0.6 per cent of the flow speed. In other words, the vertical speed through the suction slots when averaged over the whole surface is an extremely small fraction of the flow speed. Thus, the amount of energy consumed withdrawing the fluid is far lower than the energy saved in reducing the drag, yielding a net savings of about 50 per cent.

The embodiments illustrated are illustrative only, the invention being defined by the allowed claims.

I claim:

1. A method for reducing turbulent skin friction of bodies in relative motion to a field of fluid comprising the steps of:
   locating localized areas of high and low speed flow in the area adjacent to the outside surface of the bodies; and,
   fixing said areas of low and high speed flow to a given area on the body; and,
   removing said areas of low and high speed flow.

2. The method of claim 1, wherein said removing step is provided by removal of fluid in the low speed area from near the body by selective suction.

3. The method of claim 1, wherein said removing step is provided by selective injection of fluid into the high speed area near the body.

4. The method of claim 1, wherein said fixing step is accomplished by addition of ridges to said body.

5. The method of claim 4, wherein said removing step is provided by removal of fluid in the low speed area by suction.

6. The method of claim 5, wherein said suction is provided at the peaks of said ridges.

7. The method of claim 4, wherein said fixing step is provided by addition of ridges parallel to the direction of fluid flow to said body.

8. The method of claim 7, wherein said injection is provided between the peaks of said ridges.

9. The method of claim 4 wherein said fixing step is accomplished by heating fluid in the localized area adjacent the apex of said ridges.

10. The method of claim 9 wherein said heating is accomplished by use of electrical heating elements.

11. The method of claim 4 wherein said fixing step is accomplished by the injection of a polymeric solution at the apex of said, ridges.

12. The method of claim 4, wherein the said fixing step is accomplished by the provision of a compliant surface at the apex of said ridges.

13. The method of claim 4, wherein the fixing step is accomplished by the heating of fluid in the localized area between the apex of said ridges and the fluid is air.

14. An apparatus for reducing drag on objects surrounded by a boundary layer of fluid in relative motion to a field of fluid comprising;
   fixation means attached to said object for fixing low and high speed areas of fluid flow to preselected areas on said object; and,
   retardation means attached to said object for retarding the bursting process in the boundary layer of fluid around said object; and,
   timing means attached to said retardation means to randomly time its application.

15. An apparatus as in claim 14, wherein said fixation means is a series of ridges attached to said object parallel to the direction of fluid flow.

16. An apparatus as in claim 15, wherein said ridges are circular in cross section.

17. An apparatus as in claim 14, wherein said retardation means includes a series of slots parallel to said ridges.

18. An apparatus as in claim 17, wherein said slots are adapted for addition and withdrawal of fluid.

19. An apparatus as in claim 17, wherein said slots are located on the tops of said ridges and are provided for withdrawal of fluid from said boundary layer.

20. An apparatus as in claim 17 wherein said slots are so located as to coincide with the location of relative low speed fluid streaks in said boundary layer and remove said streaks when suction is applied.

21. An apparatus as in claim 17, wherein said slots are located in the valleys created between said ridges.

22. An apparatus as in claim 21, wherein said slots are adapted for injection of fluid.

23. An apparatus as in claim 22, wherein said slots are so located as to coincide with the location of areas of relative high speed fluid and destroy said areas when fluid is injected into said high speed areas.

24. An improved aircraft of the type including two wings attached to an elongated fuselage which is extended in a direction parallel to normal motion of the aircraft in a field of gas with a turbulent boundary layer adjacent to the fuselage, the improvement comprising;
   a plurality of ridges attached to the fuselage of said aircraft for fixing the area in relative low speed motion in said fluid to a point on said fuselage; and,
   a plurality of slots parallel to said ridges for adding and withdrawing fluid in said boundary layer for retarding the shedding of said areas in relative low speed motion.

25. An improved aircraft as in claim 24, further comprising:
   suction means attached to said slots for withdrawing fluid from said boundary layer in areas immediately above the peaks of said ridges.

26. An improved aircraft as in claim 24 further comprising injection means attached to said slots for injecting fluid into said boundary layer in areas between said ridges.

* * * * *

UNITED STATES PATENT AND TRADEMARK OFFICE
CERTIFICATE OF CORRECTION

PATENT NO. : 4,932,612

DATED : June 12, 1990

INVENTOR(S) : Ron F. Blackwelder et al

It is certified that error appears in the above-identified patent and that said Letters Patent is hereby corrected as shown below:

Column 1, line 7 before FIELD OF INVENTION

Please insert:

--This invention was made with Government support under contract awarded by the National Aeronautics and Space Administration. The Government has certain rights in the invention.--

Signed and Sealed this

First Day of June, 1993

Attest:

MICHAEL K. KIRK

Attesting Officer     Acting Commissioner of Patents and Trademarks